(12) United States Patent
Dutta et al.

(10) Patent No.: US 7,124,095 B2
(45) Date of Patent: Oct. 17, 2006

(54) THIRD PARTY MERCHANDISE RETURN METHOD, STORAGE MEDIUM AND IMPLEMENTING SYSTEM

(75) Inventors: Rabindranath Dutta, Austin, TX (US); Janani Janakiraman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 973 days.

(21) Appl. No.: 09/817,100

(22) Filed: Mar. 26, 2001

(65) Prior Publication Data

US 2002/0138356 A1 Sep. 26, 2002

(51) Int. Cl.
*G06Q 30/00* (2006.01)
*G06F 17/30* (2006.01)

(52) U.S. Cl. .......................................... 705/26; 705/27
(58) Field of Classification Search .................. 705/25, 705/26, 27, 1
See application file for complete search history.

(56) References Cited

U.S. PATENT DOCUMENTS

| | | | | |
|---|---|---|---|---|
| 6,269,344 B1 * | 7/2001 | Junger | .......................... | 705/28 |
| 6,717,592 B1 * | 4/2004 | Gusler et al. | ................ | 715/738 |
| 7,062,536 B1 * | 6/2006 | Fellenstein et al. | .......... | 709/206 |
| 2001/0032147 A1 * | 10/2001 | Siegel | .......................... | 705/26 |
| 2002/0013744 A1 * | 1/2002 | Tsunenari et al. | .............. | 705/28 |
| 2002/0032612 A1 * | 3/2002 | Williams et al. | ............... | 705/26 |

FOREIGN PATENT DOCUMENTS

EP          1209598 A2  *  5/2002

OTHER PUBLICATIONS

"An Online Answer for Returned Goods?" Groover, Joel, Shopping Center World, vol. 29, No. 4, p. 26, Apr. 2000.*

* cited by examiner

*Primary Examiner*—Matthew S Gart
(74) *Attorney, Agent, or Firm*—David A. Mims, Jr.; Robert V. Wilder

(57) ABSTRACT

A method and implementing system are provided in which merchants are enabled to designate re-seller return locations to customers for returned items. In an exemplary embodiment, a merchant is notified that a customer wishes to return an item purchased. The merchant then sends the customer a return label for the returned item containing the address of the re-seller for the merchant. The re-seller then notifies the merchant when the item has been received and the merchant then credits the account of the customer for the returned item. In a second exemplary embodiment, upon receipt of notice from the customer of the return, the merchant then makes the item available for an auction purchase to a number of bidders. When a winning bid is known to the merchant, the return address of the winning bidder is then sent to the customer for use in returning the purchased item.

23 Claims, 6 Drawing Sheets

THIRD PARTY MERCHANDISE RETURN METHOD, STORAGE MEDIUM AND IMPLEMENTING SYSTEM

FIELD OF THE INVENTION

The present invention relates generally to information processing systems and more particularly to a methodology and implementation for efficiently processing the disposition of merchandise which a buyer wishes to return to a network merchant.

BACKGROUND OF THE INVENTION

The use of computers and computing devices, including personal desktop and laptop computers as well as mobile and other wireless devices, to access websites on the World Wide Web (WWW) through the Internet continues to increase. More and more merchants are creating commercial websites which may be easily accessed through the Internet to place orders for items which are offered for sale at the merchant's website. The purchaser is able to pay for the purchased items by designating a credit or debit card or account number, and the merchant or "e-merchant", charges the designated account for the purchase. Shipments of the selected items are then made directly to the address specified by the purchaser.

After receipt of the items ordered, customers are able to return items purchased for any of a variety of reasons. For example, the customer or purchaser may not like the color of a particular item or an ordered technology product may not be compatible with the customer's system. In many cases, items are returned for reasons other than the reason that the item is faulty or defective. In those cases, an otherwise workable and acceptable item is returned to the selling merchant. The merchant has no option but to accept the return of such items and to try to resell the item at a greatly discounted rate. In many cases, especially where the ordered item is large and bulky such as a computer system, the shipping and insuring costs can become quite high. This is especially true where the item is return-shipped from the original purchaser to the selling merchant and then shipped again from the selling merchant to a re-selling merchant who may specialize in the re-sale of such returned items.

Thus, there is a need for an improved method and implementing system which are designed to significantly improve the efficiency and reduce the costs associated with the shipment and return of purchased items.

SUMMARY OF THE INVENTION

A method and implementing system are provided in which merchants are enabled to designate re-seller return locations to customers for returned items. In an exemplary embodiment, a merchant is notified that a customer wishes to return an item purchased. The merchant then sends the customer a return label for the returned item containing the address of the re-seller for the merchant. The re-seller then notifies the merchant when the item has been received and the merchant then credits the account of the customer for the returned item. In a second exemplary embodiment, upon receipt of notice from the customer of the return, the merchant then makes the item available for an auction purchase to a number of re-seller merchants or individuals. When a winning bid is known to the merchant, the return address of the winning bidder is then sent to the customer for use in returning the purchased item.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

The various methods discussed herein may be implemented within a typical computer-related system which may include a workstation, server or personal computer. In general, an implementing computer system at a merchant's website may include a plurality of processors in a multi-bus system in a network of similar systems. However, since the workstation or computer system implementing the present invention in an exemplary embodiment, is generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention.

Figure 1:
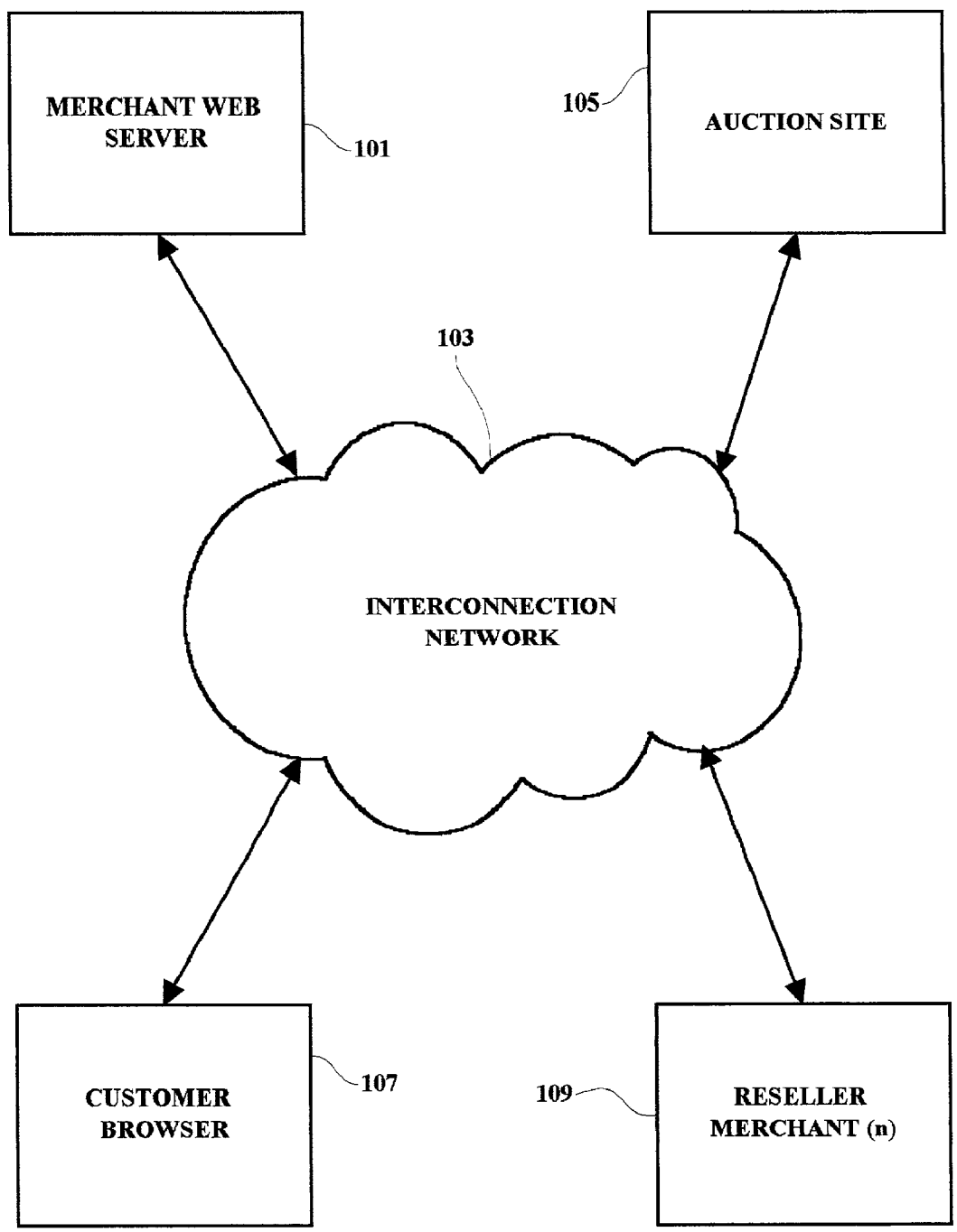
FIG. 1 is an illustration of an exemplary network layout which may be used in one implementation of the present invention.

In FIG. 1, a merchant web server 101 is shown connected to a buyer or customer's browser program for example, through an interconnection network 103 such as the Internet. In the example, a customer is running a browser program on the customer's computer system which may be a personal computer or even a wireless device. In the present disclosure, it is understood that all of the various sites illustrated include communications programming to provide the ability to send emails or instant messages to each other. In the illustrated example, the merchant website 101 and the buyer or customer 107 are also connected to an auction site 105 and to one or more ("n") reseller merchant websites 109. In one example, the merchant has a pre-existing arrangement with particular websites such as reseller 109, such that all of a designated item may be returned from the merchant 101 to the reseller merchant 109 for resale, and the auction site 105 is not used. In another example, when a customer indicates that the customer 107 wishes to return an item, the merchant 101 will auction the item to be returned at the auction website 105 prior to notifying the customer 107 where to send the item that is to be returned.

Figure 2:
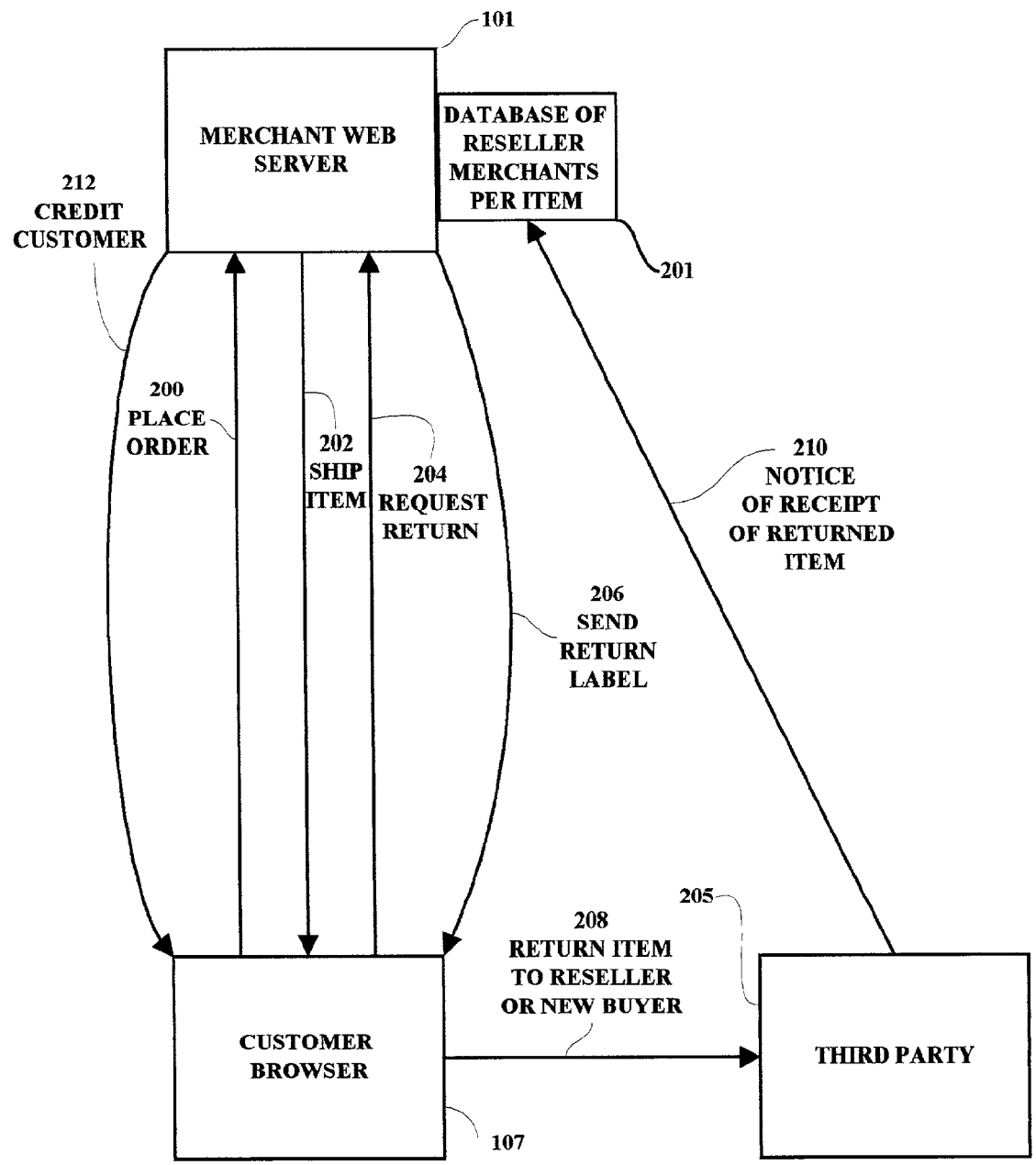
FIG. 2 is a simplified flow diagram illustrating an exemplary set of implementing transactions.

In FIG. 2, a transaction flow in accordance with one embodiment of the present invention is illustrated. As shown, a return transaction is accomplished without an auction, i.e. the reseller is known to the merchant and by a prior arrangement, the reseller has agreed to take designated items, either by consignment or sale. In such a case, the merchant 101 maintains a database 201 at the merchant's web server, 101 and the database keeps track of which resellers are to receive which returned articles as well as tracking when the return to the reseller has been completed. In the FIG. 2 example, a customer will place an order 200 for an item to be purchased. This may be accomplished, for example, by the customer filling out a merchant's order form while being connected online to the merchant's website.

Next, after the appropriate order information has been received by the merchant 101, the merchant ships 202 the ordered item to the customer and charges the customer account. Next, in the present example, the customer wishes to return the item for some reason, and sends a request to return the item 204 to the merchant, for example by email or instant message. The merchant server then obtains the reseller identity for the designated item from the merchant database 201 and sends a return label 206 to the customer 107 with the name and return address of the reseller merchant 205. In this example, Merchant B 205 is designated as the reseller for the identified item. The customer then uses the return label to send the return item 208 directly to the designated reseller 205. The designated reseller 205 then sends notice to the original merchant 101 that the return has been received 210. At that time, the database 201 is updated and the merchant credits the customer's account and sends notice of the credit 212 to the customer 107.

Figure 3:
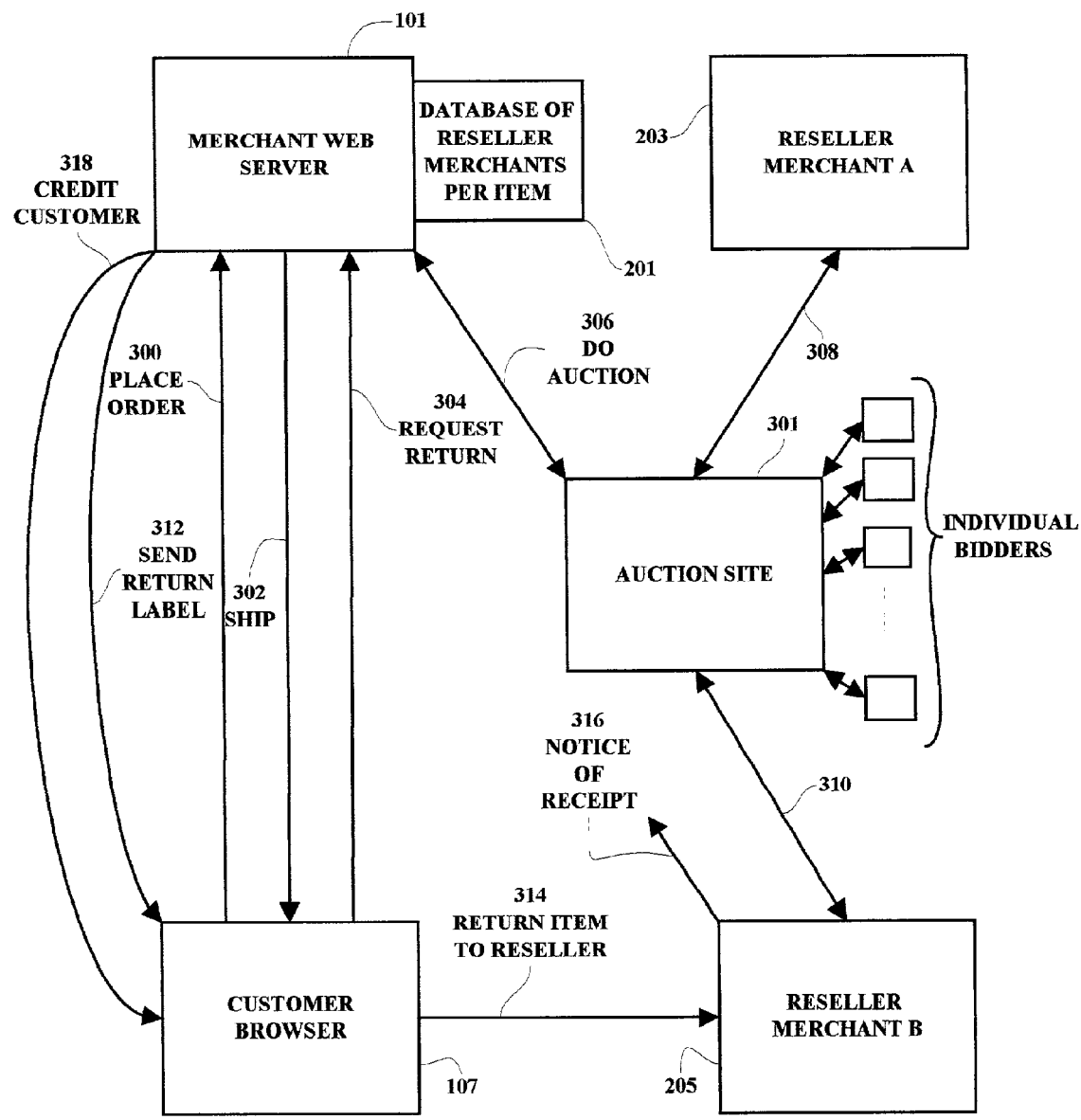
FIG. 3 is a simplified flow diagram illustrating another exemplary set of implementing transactions.

In FIG. 3, another example of the third party return system is illustrated. As shown, the FIG. 3 example includes an auction site 301, and a plurality of reseller merchants including a first reseller 203 and a second reseller 205, and individual bidders. After an order is placed 300, an item is shipped 302 and a return request 304 is sent to the selling merchant. At that time, the selling merchant puts the item identified for return up for auction at auction site 301 where several merchant and individual bidders are able to bid for the item. For purposes of explanation, it is assumed that in the illustrated example, Merchant B 205 wins the auction for the identified item. The auction site 301 or the reseller 205 will then notify the original merchant 101 and merchant 101 sends the return label 312 to the customer 107. The customer then returns the item to the designated reseller 205 and reseller 205 will then notify 316 the original merchant 101 of receipt of the returned item. The customers account is then credited and notice of the credit is then sent 318 from the merchant to the customer.

In the above examples, all of the required notices and other communications may be sent electronically by email or instant messaging for maximum efficiency and speed. Further, it is apparent that by direct shipping of return items from customers to resellers, at least two intermediate shipments, and the costs associated with such shipments, are obviated without unnecessarily delaying the return process.

Figure 4:
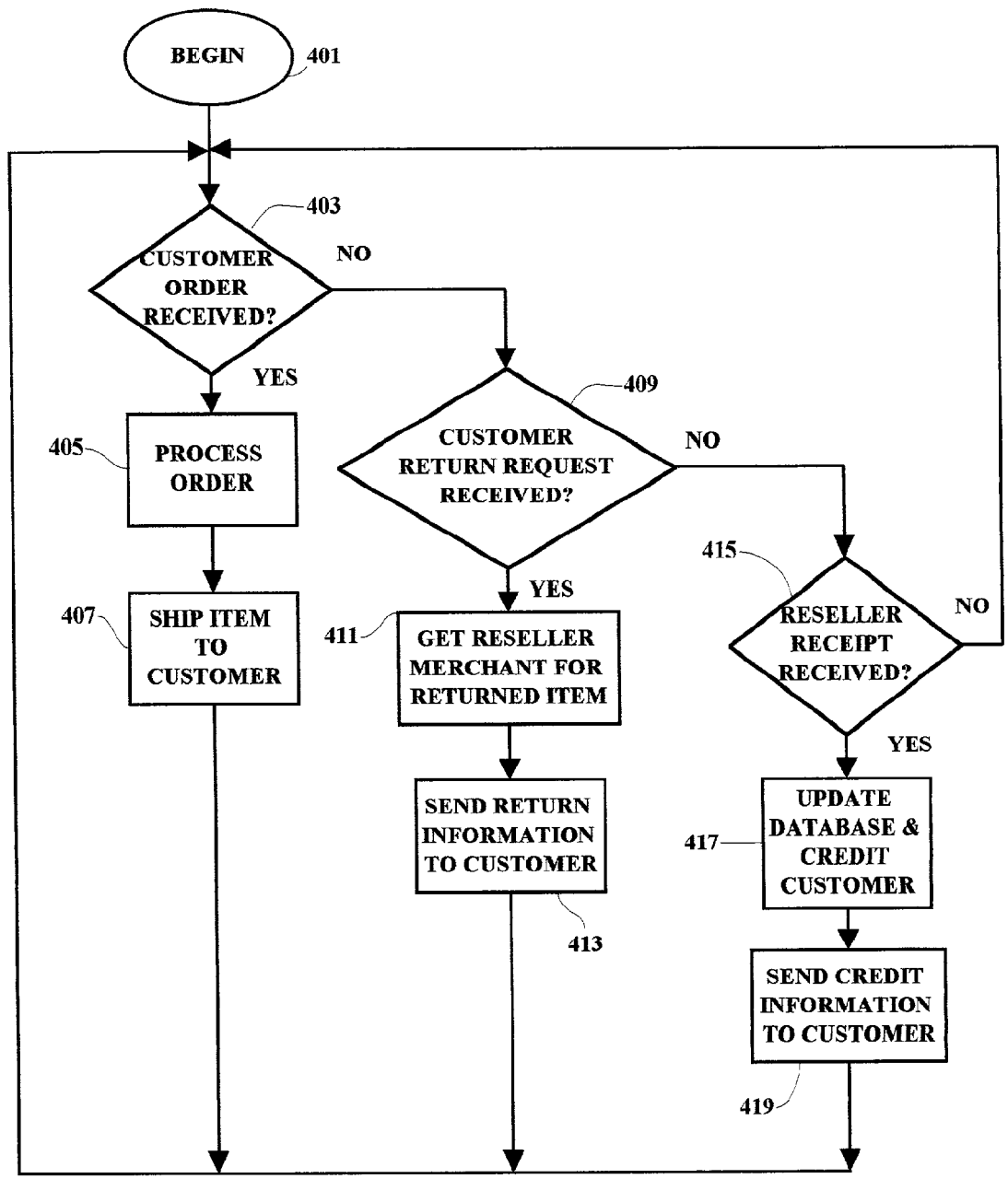
FIG. 4 is a flowchart illustrating one exemplary implementation of an operational sequence in accordance with the present invention.

FIG. 4 illustrates the non-auction implementation in flowchart form. From the illustrated flowcharts, code may be written in any of many languages and installed on the merchant website server 101, and executed from server memory to accomplish the illustrated operational sequence of events. As shown in FIG. 4, after the process begins 401, checks are continually made at the merchant server web server 101 101 to determine if any of three different events 403, 409 or 415, have occurred. As shown, if a buyer order has been received 403, the order is processed 405 and the ordered item is shipped to the buyer or customer 407. The processing of the order may include, for example the recording of the customer's name and address and the address to which the ordered item is to be shipped. Further, the initial processing 405 may also include recording the charge information and processing a charge for the item ordered and also printing the address label of the customer's shipping address.

When it is determined that a buyer or customer return request has been received 409, the merchant server will get the reseller merchant information from the reseller database 201 and send the return information, including a return label, to the buyer or customer 413.

The next step in the merchant server process occurs when the it is detected that the reseller merchant 205 has sent notice that the returned item has been received 415. At that time, the merchant's database is updated 417, the customer's account is credited and notice of the credit is sent to the customer 419.

Figure 5:
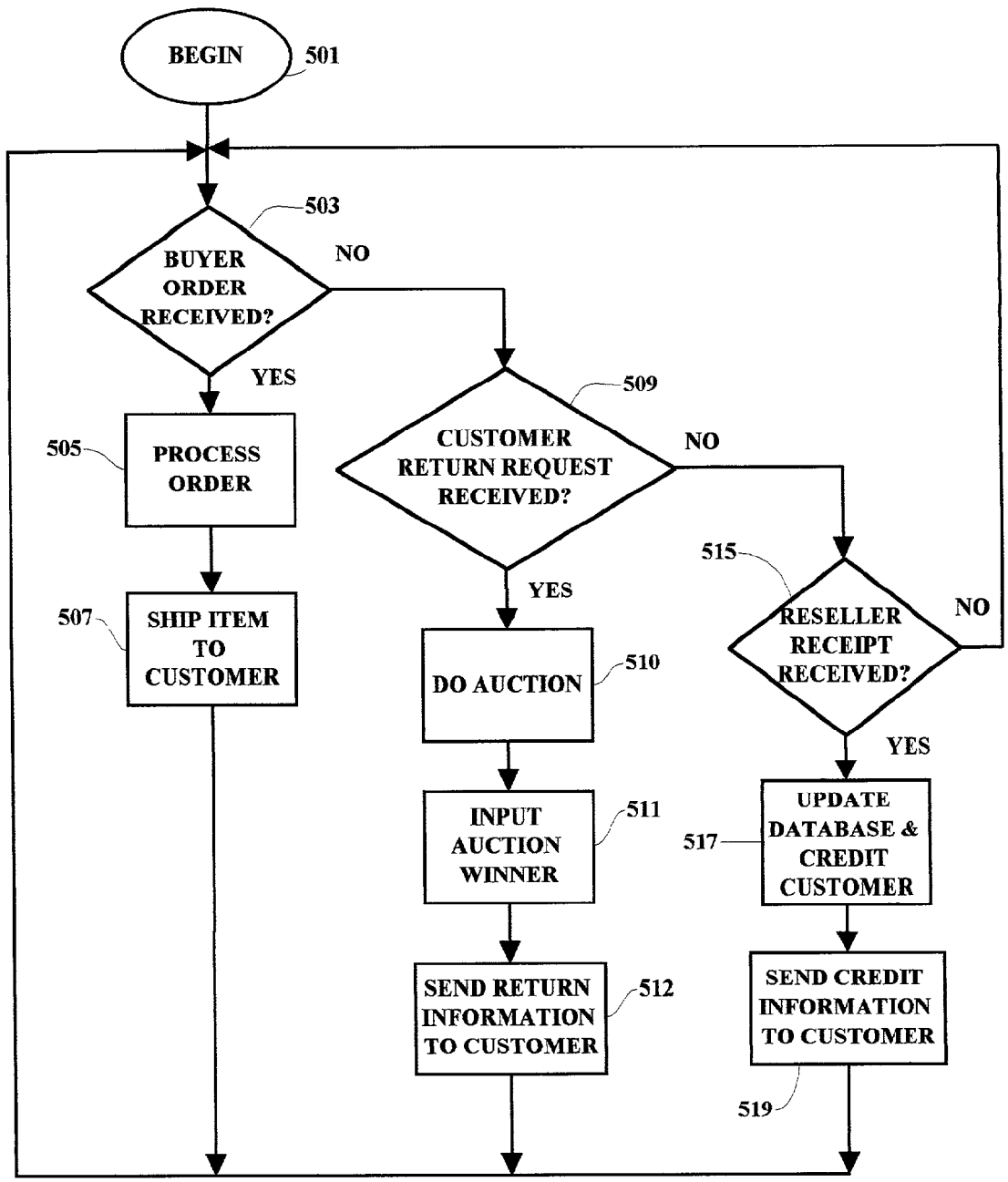
FIG. 5 is a flowchart illustrating another exemplary implementation of an operational sequence in accordance with the present invention.

The auction version of the third party return methodology is illustrated in flowchart form in FIG. 5. As shown, after the process has begun 501, when a buyer order is received 503, the order is processed 505 and the item is shipped to the buyer 507. When a return request is received 509, the merchant will do an auction 510 at an auction site and the winner of the auction will be provided to the merchant 511. The return information, including the shipping label for the winning bidder, is then sent to the customer or buyer 512. Next, the winning bidder receives the returned item directly from the buyer, and the winning bidder sends notice of such receipt to the merchant 101. When receipt of the reseller notice is detected 515, the merchant server will update the database, credit the buyer's account 517 and send notice of the credit to the buyer 519.

Figure 6:
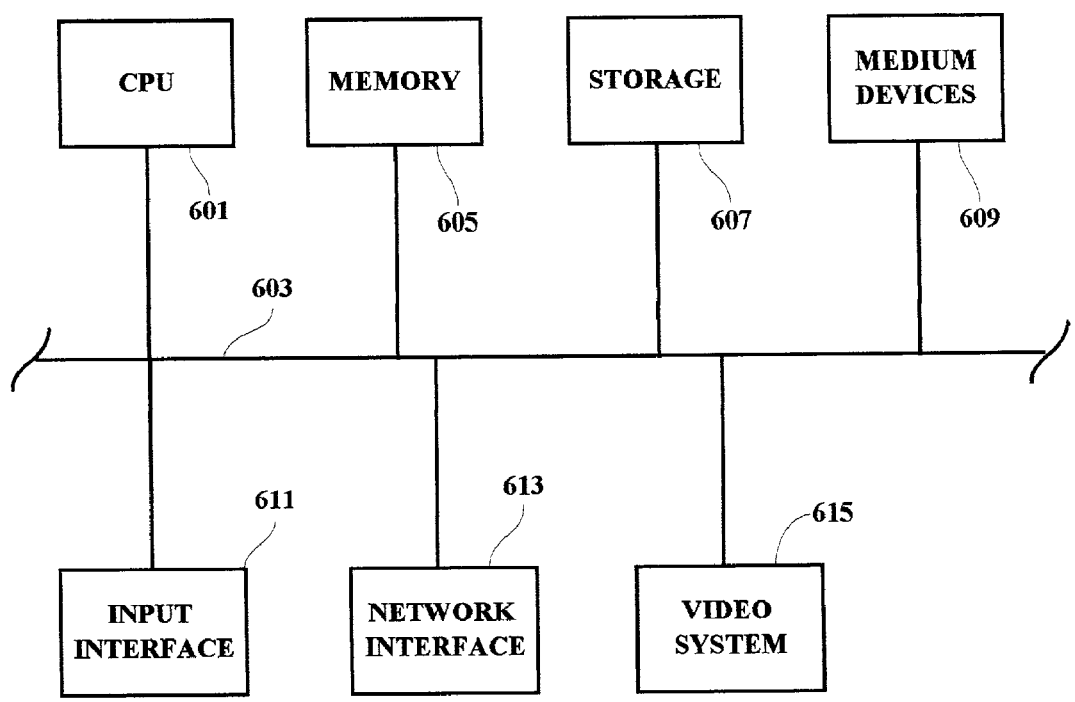
FIG. 6 is a block diagram of a computer system which is in an exemplary embodiment of the present invention.

In FIG. 6, there is shown several of the major electronic subsystems which are included in an exemplary embodiment of the merchant's server. As shown, a processor 601 is coupled to a system bus 603 which may be any host system bus. It is noted that the processing methodology disclosed herein will apply to many different bus and/or network configurations although only one example is illustrated. A memory subsystem 605, a storage device 607 and selected medium devices 609 such as a diskette drive or a CD drive, are also shown connected to the system bus 603. The information processing circuitry illustrated in FIG. 6 is arranged to establish a communication link and initiate communication with other processing systems and websites. The system, for example, may be connected through a network interface connection 613 to any appropriate network including the Internet, or to a gateway computer for connection to the Internet and selected websites which contain useful information for access. The exemplary system also includes an input interface 611 to enable administrator input to the server system, and also a video system for display of various aspects of the designated transactions at the server site.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partly in program code and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing a return of an item purchased from a selling merchant by a remote customer, said method comprising:

receiving an order for said item from said customer, said order including customer-related information;

storing said customer-related information in a storage device;

sending said item to said customer by said selling merchant;

receiving a return communication from said customer requesting a return of said item to said selling merchant;

retrieving said customer-related information from said storage device;

effecting an auction of said item by said selling merchant following said receiving of said return communication from said customer; and sending a shipping communication including portions of said customer-related information to said customer, said shipping communication identifying a receiving entity to whom said item is to be returned, said receiving entity being a winner of said auction.

2. The method as set forth in claim 1 and further including:

receiving a return receipt notice from said receiving entity when said item has been received by said receiving entity.

3. The method as set forth in claim 2 wherein said method further includes:

charging a designated customer account after receiving said order.

4. The method as set forth in claim 3 and further including crediting said customer account after receiving said return receipt notice from said receiving entity.

5. The method as set forth in claim 4 and further including sending notice of said crediting to said customer.

6. The method as set forth in claim 1 and further including maintaining a database for storing information concerning said customer, said item and said receiving entity, said database being updated upon receipt of an order, a return request or a return receipt notice.

7. The method as set forth in claim 1 wherein said receiving of said return request and said sending of said shipping communication are accomplished by email communication.

8. The method as set forth in claim 7 wherein said return receipt notice is accomplished by email.

9. The method as set forth in claim 4 wherein said notice of said crediting is accomplished by email.

10. A storage medium including machine readable coded indicia, said storage medium being selectively coupled through a reading device to processing circuitry within a computing system, said reading device being selectively operable to read said machine readable coded indicia and provide program signals representative thereof, said program signals being effective to process a return of an item purchased by a customer, said program signals being selectively operable to accomplish the steps of:

receiving an order for said item from said customer, said order including customer-related information;

storing said customer-related information in a storage device;

effecting a sending of said item to said customer by said selling merchant;

receiving a return communication from said customer requesting a return of said item to said selling merchant;

retrieving said customer-related information from said storage device;

effecting an auction of said item by said selling merchant following said receiving of said return communication from said customer; and sending a shipping communication including portions of said customer-related information to said customer, said shipping communication identifying a receiving entity to whom said item is to be returned, said receiving entity being a winner of said auction.

11. The medium as set forth in claim 10 wherein said program signals are further operable for:

effecting a receipt a return receipt notice from said receiving entity when said item has been received by said receiving entity.

12. The medium as set forth in claim 11 wherein said program signals are further operable for:

effecting a charging a designated customer account after receiving said order.

13. The medium as set forth in claim 12 wherein said program signals are further operable for effecting a crediting of said customer account after receiving said return receipt notice from said receiving entity.

14. The medium as set forth in claim 13 wherein said program signals are further operable for effecting said sending of said notice of said crediting to said customer.

15. The medium as set forth in claim 10 and further including maintaining a database for storing information concerning said customer, said item and said receiving entity, said program signals being further operable for updating said database upon receipt of an order, a return request or a return receipt notice.

16. The medium as set forth in claim 10 wherein said receiving of said return request and said sending of said shipping communication are accomplished by email communication.

17. The medium as set forth in claim 16 wherein said return receipt notice is accomplished by email.

18. The medium as set forth in claim 13 wherein said notice of said crediting is accomplished by email.

19. A processing system including a system bus, a processor, a memory system, and a network interface, all coupled to said system bus said processing system being operable in response to an item return program being executed from said memory system for effecting a return of an item purchased from a selling merchant by a customer at a remote location through said network interface, said processing system being selectively operable to receive an order for said item from said customer over said network interface, said order including customer-related information, storing said customer-related information in said memory system, and effecting a sending of said item to said customer by said selling merchant, said processing system being further operable for receiving a return communication from said customer requesting a return of said item to said selling merchant, retrieving said customer-related information from said memory system, effecting an auction of said item by said selling merchant following said receiving of said return communication from said customer, and sending a shipping communication including portions of said customer-related information to said customer, said shipping communication identifying a receiving entity to whom said item is to be returned, said receiving entity being a winner of said auction.

20. The system as set forth in claim 19 and further including:

receiving a return receipt notice from said receiving entity through said network interface when said item has been received by said receiving entity.

21. The system as set forth in claim 20 wherein said method further includes:

charging a designated customer account in said memory system after receiving said order.

22. The system as set forth in claim 21 and further including crediting said customer account in said memory system after receiving said return receipt notice from said receiving entity.

23. The system as set forth in claim 22 wherein said system is further operable to effect a sending of a notice of said crediting to said customer through said network interface.

* * * * *